J. EVANS, dec'd.
C. MEYER & MARY A. EVANS, Adm's.

Rubber Overshoes.

No. 6,138. Reissued Nov. 17, 1874.

WITNESSES

Wm Handy
J. C. Meyer

INVENTOR

C. Meyer
Mary A. Evans adm'x

THE GRAPHIC CO. PHOTO-LITH. 39 & 41 PARK PLACE, N.Y.

UNITED STATES PATENT OFFICE.

CHRISTOPHER MEYER, OF NEW YORK, N. Y., AND MARY A. EVANS, OF NEW BRUNSWICK, N. J., ADMINISTRATRIX OF JOHN EVANS, DECEASED.

IMPROVEMENT IN RUBBER OVERSHOES.

Specification forming part of Letters Patent No. 111,962, dated February 21, 1871; reissue No. 4,977, dated July 16, 1872; reissue No. 6,138, dated November 17, 1874; application filed July 9, 1874.

*To all whom it may concern:*

Be it known that CHRISTOPHER MEYER, of the city, county, and State of New York, and JOHN EVANS, deceased, late of New Brunswick, in the county of Middlesex and State of New Jersey, did invent a new and useful Improvement in India-Rubber Shoes, of which the following is a specification:

The said invention relates to india-rubber shoes, employing or using strengthening or projecting ribs or cords upon their uppers; and consists in having such strengthening-ribs thickened up from and homogeneous with the substance of the body of the upper, as distinguished from ribs formed by lapping one piece of rubber upon another, or by turning over the edge to form such a rib or cord, and then cementing such parts or edge together, which invention is more fully hereinafter described and specified.

Figure 1:
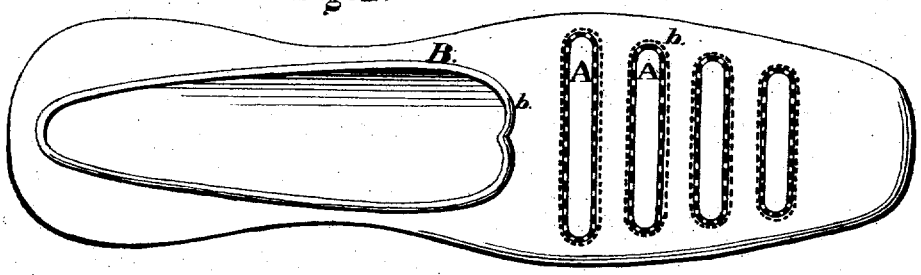
Figure 3:
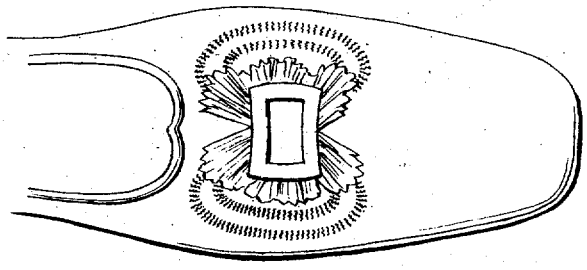
Figure 2:
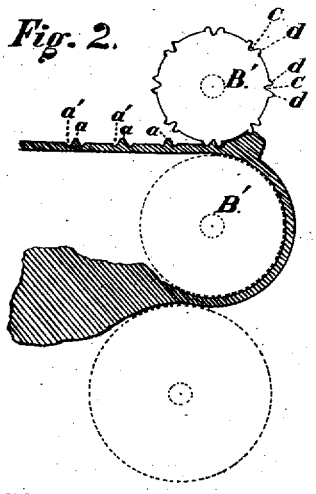
Figure 4:
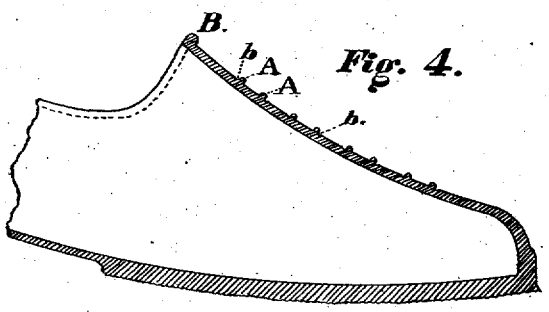

Figures 1 and 3 represent plan views of different ribs so formed; and Fig. 2, a sectional view of forming-rolls, with the plastic substance passing through them. Fig. 4 is a section of Fig. 1.

A A, in Fig. 1, represent ribs extending transversely across the front part of the upper, inclosing spaces similar in configuration to the openings in the uppers of ordinary rubbers; and A′ A′, in Fig. 3, represent such ribs arranged in resemblance of an ornamental buckle. B represents a strengthening-rib around the top or mouth of the shoe; and *b* is an imitation thread or stitching by the side of each rib. B′, in Fig. 2, represents rolls, of which the lower is plain, and the upper ribbed or pointed at *d*, and grooved at *c*, so as to make the ribs A A′ upon the front of the upper, or the rib B around the top or mouth of the shoe, and the rows of imitation stitching *b*. Such ribbed or pointed portions and grooves will be in any location on the rollers, according to the desired outline or location of the rib and imitation stitching on the upper; but the groove for forming the rib B will always be so located on the roller as to form such strengthening-rib at and around the top or mouth of the shoe.

The imitation stitches may consist either of indentations formed in the surface of the sheet or of points projecting above the surface—the former will be formed by projections on the roller, and the latter by indentations.

*a* represents the ribs formed from the plastic rubber as it is carried through the rolls; and it will be observed that they are not corrugations, like the strengthening-ribs used upon metals, but they are a thickening up of the substance of the sheet in the given lines and directions, thereby making at those places an increased quantity and thickness of substance, which is also homogeneous with the body of the upper, causing the ribs to stand up from the general plane of the surface. The ribs A A′ across the front of the rubber, when made, are chiefly ornamental, though they impart some strength from their increased thickness; but the rib B, around the top or mouth of the shoe, is designed particularly for giving increased strength at that part of the shoe, and thereby to prevent its tearing down when being put on or taken off the foot, which frequently happens when such rib is made by a separate strip of rubber, not a part of the upper, and gummed to it and secured by vulcanization; or when the top of the shoe is turned or rolled over into a sort of rib by the hand, and afterward vulcanized. In this figure *a′* represents the indentations to imitate stitching.

The process through which the material passes to bring it into the condition required is as follows: The mass of plastic rubber is forced into the opening between the molding or shaping rolls, and drawn out into a sheet with the ribs and imitation stitching completely formed. It is then cut out and made up into the shoe or sandal, and vulcanized.

The strengthening-ribs are thus produced in absolute union with, and as an actual part and portion of, the substance of the sheet or upper, the substance of such ribs being homogeneous and solid with the body of the upper. The shoe is therefore much better and stronger than when such ribs, particularly the one around the top or opening, are formed of separate strips laid on in the gummy state after the sheet is formed, and secured to it in the vulcanizing process, or when the edge is turned over by hand and afterward cemented and vulcanized, as in the common way, and being formed at the same time the sheet is rolled, and by the same operation, the ribs are made upon the upper without expense other than the preparing of the rolls. The ribs so formed will also be much more perfect and uniform than when made or put on by hand, as above described. The same is also true as to the imitation stitching, which has heretofore been made by a pointed wheel, rolled by hand along the sides of the rib.

It is known that the uppers of rubbers have been made, to some extent, by means of rolls, engraved so as to give to such uppers merely an ornamental or figured surface; but it is not known that the uppers of rubbers have ever before been made having strengthening-ribs around the top or mouth of the shoe, or elsewhere on the uppers, homogeneous with or an actual part or portion of the substance of the upper.

Having described the invention, what is claimed as new is—

As a new article of manufacture, india-rubber shoes having a strengthening rib around the top or mouth of the shoe, (whether with or without similar ribs on other parts of the shoe,) formed not by turning over the edge or lapping one piece upon another, but thickened up from and homogeneous with and forming a part or portion of the body of the upper, substantially as specified.

C. MEYER.
MARY A. EVANS,
*Administratrix.*

Witnesses:
WM. HANDY,
J. C. MEYER.